(12) United States Patent
Ponniah et al.

(10) Patent No.: US 10,991,370 B2
(45) Date of Patent: Apr. 27, 2021

(54) SPEECH TO TEXT CONVERSION ENGINE FOR NON-STANDARD SPEECH

(71) Applicant: INTERNATIONAL BUSINESS MACHINES CORPORATION, Armonk, NY (US)

(72) Inventors: Anbumunee Ponniah, Bangalore (IN); Satheesh Kumar Thankappan Nair, Bangalore (IN); Nithin Mathew, Bangalore (IN); Ashish Rajoriya, Madhya Pradesh (IN); Ashish Malgawa, Madhya Pradesh (IN); Mansi Garg, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/385,017

(22) Filed: Apr. 16, 2019

(65) Prior Publication Data

US 2020/0335099 A1 Oct. 22, 2020

(51) Int. Cl.
*G10L 15/22* (2006.01)
*G10L 15/02* (2006.01)
*G10L 15/18* (2013.01)

(52) U.S. Cl.
CPC ............. *G10L 15/22* (2013.01); *G10L 15/02* (2013.01); *G10L 15/1815* (2013.01); *G10L 15/1822* (2013.01); *G10L 2015/027* (2013.01)

(58) Field of Classification Search
None
See application file for complete search history.

(56) References Cited

U.S. PATENT DOCUMENTS 5,832,181 A   11/1998 Wang
8,346,555 B2 *  1/2013 Metz ................. G10L 15/197
                                                              704/257

(Continued)

FOREIGN PATENT DOCUMENTS

WO     2018063293 A1    4/2018

OTHER PUBLICATIONS

Bassil et al., "ASR Context-Sensitive Error Correction Based on Microsoft N-Gram Dataset", Journal of Computing, vol. 4, Issue 1, Jan. 2012, ISSN 2151-9617, https://sites.google.com/site/journalofcomputing, www.journalofcomputing.org, pp. 1-9.

(Continued)

*Primary Examiner* — Neeraj Sharma
(74) *Attorney, Agent, or Firm* — Robert D. Bean (57) ABSTRACT

Using a computing device to convert verbal communications including non-standard speech to text. The computing device receives an audio recording of voice and generates a standard text log. A standard word dictionary is retrieved. Non-standard words not found in the word dictionary are determined. Portions of the audio recording corresponding to the non-standard words are retrieved. Portions of the audio recording corresponding to non-standard words into input into a natural language understanding model. The computing device utilizes the results of the natural language understanding model to determine a best-match non-standard dictionary. One or more portions of the audio recording are used to generate a non-standard text log. The standard text log and non-standard text log are merged.

17 Claims, 7 Drawing Sheets

(56) References Cited

U.S. PATENT DOCUMENTS

| | | | |
|---|---|---|---|
| 8,498,872 B2 | 7/2013 | White et al. | |
| 8,719,014 B2 | 5/2014 | Wagner | |
| 10,573,314 B2* | 2/2020 | Khaleghi | A61B 5/165 |
| 2002/0138656 A1* | 9/2002 | Hickey | G06F 9/454 |
| | | | 709/250 |
| 2003/0009339 A1* | 1/2003 | Yuen | H04M 3/4938 |
| | | | 704/260 |
| 2003/0216919 A1* | 11/2003 | Roushar | G06F 40/30 |
| | | | 704/260 |
| 2008/0126100 A1 | 5/2008 | Grost et al. | |
| 2008/0140398 A1* | 6/2008 | Shpigel | G10L 15/26 |
| | | | 704/235 |
| 2013/0289993 A1 | 10/2013 | Rao | |
| 2013/0346076 A1 | 12/2013 | Stewart et al. | |
| 2014/0012568 A1 | 1/2014 | Caskey et al. | |
| 2014/0019126 A1* | 1/2014 | Abrams | G10L 15/26 |
| | | | 704/235 |
| 2014/0081626 A1* | 3/2014 | Chang | G06F 40/30 |
| | | | 704/9 |
| 2015/0142704 A1* | 5/2015 | London | G06N 5/022 |
| | | | 706/11 |
| 2016/0093298 A1* | 3/2016 | Naik | G10L 13/08 |
| | | | 704/235 |
| 2017/0069325 A1 | 3/2017 | Braga et al. | |
| 2017/0344641 A1* | 11/2017 | Parkunan | G06F 16/3338 |
| 2018/0108354 A1* | 4/2018 | Negi | G10L 15/26 |
| 2020/0285699 A1* | 9/2020 | Nogima | G06F 40/35 |

OTHER PUBLICATIONS

Jeong, Using Higher-Level Linguistic Knowledge for Speech Recoginition Error Correction in a Spoken q/a Dialog (2004), Citeseer, http://citeseerx.ist.psu.edu/viewdoc/summary?doi=10.1.1.107.4179, pp. 1-9.

Raju, "Contextual Clues Can Help Improve Alexa's Speech Recognizers",https://developer.amazon.com/blogs/alexa/post/ab5bd7dd-ffa4-4607-b5b . . . , Jul. 23, 2018, pp. 1-3.

Hacker, "A Phonetic Similarity Based Noisy Channel Approach to ASR Hypothesis Re-Ranking and Error Detection", 2014 IEEE International Conference on Acoustic, Speech and Signal Processing (ICASSP), pp. 1-5.

Mell et al., "The NIST Definition of Cloud Computing", National Institute of Standards and Technology, Special Publication 800-145, Sep. 2011, pp. 1-7.

* cited by examiner

SPEECH TO TEXT CONVERSION ENGINE FOR NON-STANDARD SPEECH

BACKGROUND

The present invention relates generally to the field of speech to text conversion, and more particularly to a speech to text conversion engine for non-standard terms.

BRIEF SUMMARY

Embodiments of the present invention disclose a method, computer program product, and computer system for using a computing device to convert verbal communications including non-standard speech to text. The computing device receives an audio recording of voice and converts the audio recording to a computer-usable form usable by the computing device. The computing device analyzes the computer-usable form of the audio recording to generate a standard text log for the audio recording. The computing device retrieves a standard word dictionary. The computer device compares one or more words from the standard text log to the standard word dictionary to determine one or more non-standard words not found in the word dictionary. The computing device retrieves one or more portions of the audio recording corresponding to the one or more non-standard words. The one or more portions of the audio recording corresponding to the one or more non-standard words are fed into a natural language understanding model. The computing device utilizes the results of the natural language understanding model to determine a best-match non-standard dictionary for interpreting the one or more non-standard words.

The computing device retrieves the best-match non-standard dictionary. The computing device analyzes the or more portions of the audio recording corresponding to the one or more non-standard words utilizing the best-match non-standard dictionary to generate a non-standard text log. The computing device merges the standard text log and the non-standard text log to generate a complete text log.

DETAILED DESCRIPTION

Speech to text solutions are a well-researched area of computer science for over fifty years, and modern algorithms are on-par with humans in interpretation of voice to generate text logs of an individual speaking or a text log of a conversation involving multiple people. There is an area, however, where speech to text solutions are lacking, and that is where human speech contains specialized language such as business language, technical language, foreign language, medical language, engineering language, or other any other specialized language designed to communicate ideas to a certain audience, whether the audience be a general audience, a technically-trained audience with specialized knowledge, or even a computer, receiving text logs for further processing or storage, or technical or otherwise. Together, these specialized languages, for the purposes herein, can be considered "non-standard speech" (or, as discussed "non-dictionary words"). Presented is a system, method, and computer program product for converting verbal communications including non-standard speech into text, for utilization by a general audience, a technically-trained audience, a computer, or in any other way.

Figure 1:
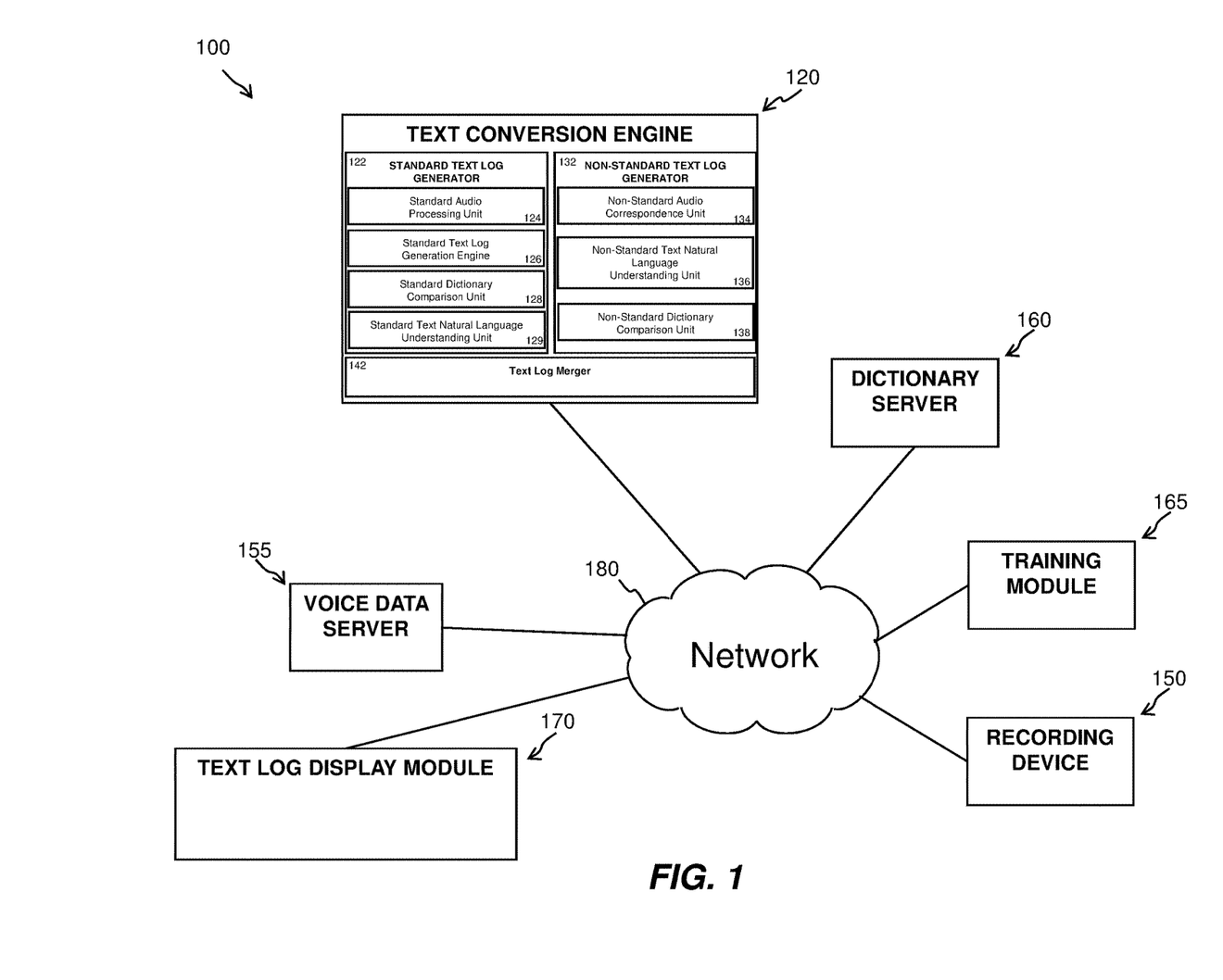
FIG. 1 is a functional block diagram illustrating an environment 100 for converting verbal communications including non-standard speech to text, in accordance with an embodiment of the present invention.

FIG. 1 is a functional block diagram illustrating an environment 100 for converting verbal communications including non-standard speech to text, in accordance with an embodiment of the present invention. Environment 100, in an embodiment of the invention, includes one or more of text conversion engine 120, recording device 150, voice data server 155, dictionary server 160, training module 165, and text log display module 170. All are connected via network 180, as further discussed below. One or more individuals speak into recording device 150 which records the one or more individuals' voice. Alternatively or in addition to individuals speaking into recording device 150, voice may be previously recorded and available at voice data server 155. Whether the recording device 150 records voice in real-time, or voice data server 155 provides previously recorded voice, text conversion engine 120 receives an audio recording of voice, for further processing as discussed herein. Text conversion engine 120 in conjunction with dictionary server 160 and other elements as further described herein then generate a standard text log containing standard words (such as, by means of non-limiting example, those found in a standard dictionary stored on and made available from dictionary server 160, and/or used in everyday conversation, etc. and located in the standard dictionary) and a non-standard text log containing non-standard words, such as business language, technical language, foreign language, medical language, engineering language, etc. such as not found in a standard dictionary (as further discussed herein), but found in non-standard dictionary, also as further discussed herein. (As used herein, "non-standard words" may be used interchangeably with "non-dictionary words" and may refer to words not found in a standard dictionary, also, as further discussed herein.) In alternative embodiments of the invention, the non-standard text log may alternatively and/or additionally contain descriptions, text, and/or other information describing and/or regarding sound-based information, such as computer-generated sounds (e.g. "modem connecting"), musical notes (e.g. "C Sharp"), musical compositions (e.g. "Mozart's Symphony 29"), atmospheric noise (e.g. "wind blowing"), other sound-based information, and/or any combination of these. (In various embodiments of the invention, standard dictionary and/or non-standard dictionary may be trained, at least in-part, by training module 165, as discussed further herein.) The text conversion engine 120 then, as further discussed herein, merges the standard text log and the non-standard text log to generate a complete text log. The complete text log, in various embodiments of the invention, is provided to a user via text log display module 170, transmitted to a computing device for further processing, stored, is made available elsewhere via network 180, or is utilized in other ways.

Text conversion engine 120, recording device 150, voice data server 155, dictionary server 160, training module 165, and text log display module 170 (whichever are available, in the embodiment of the invention), are connected via network 180. In various embodiments of the invention, network 180 represents, for example, an internet, a local area network (LAN), a wide area network (WAN) such as the Internet, and includes wired, wireless, or fiber optic connections. In a further embodiment of the invention, portions of network 180 may simply be a communication bus internal to a computer device (or the equivalent), allowing one or more of text conversion engine 120, recording device 150, voice data server 155, dictionary server 160, training module 165, and text log display module 170 to function in physically the same computing device. In general, network 180 may be any combination of connections and protocols that will support communications between text conversion engine 120, recording device 150, voice data server 155, dictionary server 160, training module 165, and text log display module 170, as these are available in the embodiment of the invention.

In various embodiment of the invention, text conversion engine 120, recording device 150, voice data server 155, dictionary server 160, training module 165, and text log display module 170 may each be, by means of non-limiting example, a mainframe or a mini computer, a terminal, a laptop, a tablet, a netbook personal computer (PC), a mobile device, a desktop computer, or any other sort of computing device, in accordance with embodiments described herein. Text conversion engine 120, recording device 150, voice data server 155, dictionary server 160, training module 165, and text log display module 170 may include internal and external hardware components as depicted and described further in detail with reference to FIG. 3, below. In other embodiments, each of text conversion engine 120, recording device 150, voice data server 155, dictionary server 160, training module 165, and/or text log display module 170 may be implemented in a cloud computing environment, as described in relation to FIGS. 4 and 5, below. In a still further embodiment, some or all of text conversion engine 120, recording device 150, voice data server 155, dictionary server 160, training module 165, and/or text log display module 170 are embodied in physically the same computing device, with all communications between various components made internally.

Text conversion engine 120, recording device 150, voice data server 155, dictionary server 160, training module 165, and/or text log display module 170, in effect, represent any sort of computing device possessing sufficient processing power to execute software and/or hardware to convert verbal communications including non-standard speech to text, in accordance with an embodiment of the invention. Computing devices associated with text conversion engine 120, recording device 150, voice data server 155, dictionary server 160, training module 165, and/or text log display module 170 may utilize a hosted workload 96 as displayed in connection with FIG. 5 below, and/or perform other tasks as further described herein.

In an embodiment of the invention, text conversion engine 120 represents software and/or hardware for generating standard text logs, non-standard text logs, and/or complete text logs in various embodiments of the invention and includes a standard text log generator 122, a non-standard text log generator 132, and a text log merger 142. Standard text log generator 122, in various embodiments of the invention, includes standard audio processing unit 124, standard text log generation engine 126, standard dictionary comparison unit 128, and standard text natural language understanding unit 129. Non-standard text log generator 132, in various embodiments of the invention, includes non-standard audio correspondence unit 134, non-standard text natural language understanding unit 136, and non-standard dictionary comparison unit 138. Text conversion engine 120 further includes, in various embodiments of the invention, text log merger 142. In various embodiments of the invention, text conversion engine 120 may be operatively connected to, recording device 150, voice data server 155, dictionary server 160, training module 165, and/or text log display module 170. The operative connections may be a wired or wireless direct connection, or via network 180.

Standard audio processing unit 124 of standard text log generator 122 represents software and/or hardware for receiving an audio recording of voice from recording device 150, voice data server 155, and/or any other source of audio recordings. The audio recording received by standard audio processing unit 124 may be in any audio file format, including .mp3, .mpeg, .avi, .wma, or any other presently-existing or after-arising computerized audio file format. After receipt of the audio recording, standard audio processing unit 124 converts the audio recording to a computer-usable form. In various embodiments of the invention, standard audio processing unit 124 may, by means of non-limiting example, analyze the audio recording received from recording device 150, voice data server 155, or elsewhere, and determine high and low points as well as relative values of waveforms in/or describing the audio recording, or utilize another equivalent manner of converting the audio recording to a computer-usable form capable of being further utilized in connection with the presently disclosed invention.

Standard text log generation engine 126 of standard text log generator 122 represents software and/or hardware for analyzing the computer-usable form of the audio recording generated by the standard audio processing unit 124 and generating a standard text log for the audio recording. The standard text log generated may have "gaps" or inconsistencies when non-standard words, such as business language, technical language, foreign language, medical language, engineering language, music, computer sounds, musical notes, atmospheric noise, etc. are included in the audio recording, and the non-standard word is not understood by standard text log generation engine 126, as further discussed herein. The standard text log generation engine 126 may utilize, by means of non-limiting example in various embodiments of the invention, a Hidden Markov Model, Dynamic Time-Warping Based Speech Recognition, neural networks, or any presently-existing or after-arising equivalent.

In certain circumstances, standard text log generation engine 126 may not include a "gap" in a standard text log generated by standard text log generation engine 126, but may interpret a word incorrectly, and such circumstances are also contemplated herein. For example, if the audio recording includes the Italian word "si" meaning "yes" in Italian or Spanish, as "see" in English in the standard text log, the standard text log generated may be incorrect indicating "see," and the standard text log would need correction. If, on the other hand, the Italian word "andiamo" (meaning "let's go") is heard included in the audio recording, a "gap" may be included in the standard text log, since no equivalent-sounding English word exists. In various embodiments of the invention, standard text natural language understanding unit 129 may utilize natural language understanding software, as further discussed herein, to analyze the standard text log and determine one or more non-standard words.

Standard dictionary comparison unit 128 of standard text log generator 122 represents software and/or hardware for retrieving from dictionary server 160 a standard word dictionary, and comparing one or more words from the standard text log to the standard word dictionary (generated by the standard text log generation engine 126) for whether they are included (i.e. found) in the standard word dictionary. Standard dictionary comparison unit 128 makes note of which words in the standard text log are not included in the standard word dictionary, and stores such data in variables, a matrix, a linked list, an object, or any equivalent computer data structure for further processing herein. In the example discussed previously, if the standard dictionary comparison unit 128 detects the word "andiamo," standard dictionary comparison unit 128 determines the word is not included in the standard word dictionary and such information is stored for further processing as described below.

Standard text natural language understanding unit 129 represents software and/or hardware for, in various embodiments of the invention, to analyze the standard text log and, in conjunction with the standard dictionary comparison unit 128, or acting without the assistance of the standard dictionary comparison unit 128, to determine one or more non-standard words in the standard text log which are "non-dictionary words" or "non-standard words." In various embodiments of the invention, for example, standard text natural language understanding unit 129 may review the standard text log, and determine that even though no "gap" exists in the text log, a word was not transcribed correctly into the text log, and the text log may be corrected such as by using natural language understanding, as further described herein. For example, if the Italian word "si" was included in the text log, but transcribed by standard text log generation engine 126 as "see," a "non-standard word" would be detected, for further processing, since the standard text natural language understanding unit 129 would detect an anomaly in the standard text log.

Non-standard audio correspondence unit 134 of non-standard text log generator 132 represents software and/or hardware for retrieving one or more portions of the audio corresponding to the one or more non-standard words located by the standard text log generator 122, as described elsewhere herein. If audio was previously recorded, and made available via the voice data server 155, voice data sever 155 may be accessed again by non-standard audio correspondence unit 134 to obtain the portions of the audio corresponding to the one or more non-standard words. If audio was recorded in real-time, such as by recording device 150, non-standard audio correspondence unit 134 may access internal storage of the text conversion engine 120 (not displayed here), or other locations to obtain the portions of the audio.

Non-standard text natural language understanding unit 136 of non-standard text log generator 132 represents software and/or hardware for inputting the portions of the audio recording corresponding to the non-standard words (or "non-dictionary words") into natural language understanding software, to determine a best-match non-standard dictionary for interpreting the non-standard words. In further embodiments of the invention, non-standard text natural language understanding unit 136 may also review audio associated with "gaps" or inconsistencies in the standard text log, and utilizes the audio itself to determine which non-standard dictionary to utilize (such as by comparing results from searches of different non-standard dictionaries, pronunciations, inflections of voices, best-fit analyses, or any other means. In various embodiments of the invention, more than one best match non-standard dictionary may be utilized in order to generate the complete text log, as further discussed herein, with either all non-standard dictionaries being accessed and utilized, or the determined best non-standard dictionary being accessed and utilized for each non-standard word and/or "gap" in the standard text log. In various embodiments of the invention, domain-specific rules unique to each non-standard dictionary may be utilized to assist in determining which non-standard dictionary to use.

Non-standard dictionary comparison unit 138 of non-standard text log generator 132 represents software and/or hardware for retrieving the appropriate non-standard dictionar(ies) previously, determined by the non-standard text natural language understanding unit 136 (such as from the dictionary server 160), and accessing the non-standard dictionar(ies) for further utilization in connection with the presently disclosed invention. After accessing the non-standard dictionaries, non-standard dictionary comparison unit 138 analyzes the portions of the audio recording corresponding to the non-standard words (previously found by the standard text log generator 126), and generates a non-standard text log including these words. The non-standard text log contains one or more textual representations of the "gaps," inconsistencies, or words interpreted incorrectly, etc., such as found in the standard text log generated by the standard text log generator 122, for further utilization as discussed herein.

Text log merger 142 represents software and/or hardware for merging the standard text log generated by the standard text log generator 122 and the non-standard text log generated by the non-standard text log generator to generate a complete text log. The complete text log includes both standard and non-standard words (or dictionary and non-dictionary words, as further discussed herein) to best make complete transcript of an individual speaking, a conversation between multiple individuals, or any other recording of voice such as in a movie, television show, etc. Text log merger 142 also, in various embodiments of the invention, serves to transmit the complete text log after generation to text log display module 170, or make available the complete text log elsewhere in environment 100 (or externally to environment 100) for storage, further processing, etc.

Dictionary server 160 represents software and/or hardware for storing standard dictionar(ies) and/or non-standard dictionar(ies) for utilization in connection with the presently disclosed invention. Standard dictionar(ies) stored by dictionary server 160, in various embodiments of the invention, may contain various words, expressions, slang, and/or other terms used in everyday written works or everyday speech in the *lingua* franca of an area, such as English for the United States, or French in France. The contents of standard dictionar(ies) vary in different embodiments of the invention, and may contain more or less information. Non-standard dictionar(ies) included and stored in the dictionary server 160 (or made available via the dictionary server 160) may include one or more of a business dictionary, a technical dictionary, a medical dictionary, a foreign language dictionary, a sound dictionary (utilized to identify, by means of non-limiting example, computer-generated sounds, musical notes, musical compositions, atmospheric noise, and/or any combination of these). Non-standard dictionaries may contain various words, technical terms, scientific terms, foreign language vocabulary, sound-based expressions, or other non-standard terms for interpretation as further discussed herein. In various embodiments of the invention, dictionary server 160 also contains one or more domain-specific rules specific to each standard and/or non-standard dictionary with regard to selection of the appropriate standard dictionary or non-standard dictionary, or domain-specific rules utilized by each standard and/or non-standard dictionary to best interpret words, terms, audio, etc., as further discussed herein. The dictionaries stored by dictionary server 160 may be stored in various sort of databases, objects, or the equivalent. As is further discussed below, standard dictionary and/or non-standard dictionar(ies) stored by dictionary server 160 may trained totally, or in-part by training module 165, further discussed below.

Training module 165 represents software and/or hardware for training standard dictionary and/or non-standard dictionar(ies) stored and maintained by dictionary server 160, in various embodiments of the invention. In various embodiments of the invention, training module 165 may train the standard dictionary and/or non-standard dictionar(ies) from scratch, or modify previously created standard and/or non-standard dictionaries to create dictionaries which are more effective in interpreting standard and/or non-standard words. In various embodiments of the invention, training module 165 may use machine learning (such as, by means of non-limiting example, a Hidden Markov Model machine learning algorithm), in association with feedback (or without feedback) from a user regarding results of a machine learning model (and/or other training methods), to create more effective and/or efficient standard and/or non-standard dictionar(ies). In various embodiments, of the invention, for example, training module can "learn" that a SKU number interpreted with the use of a non-standard dictionary (focused on business) is 18 characters, while an order number interpreted with the same non-standard business dictionary is 14 characters, and rather than provide the 18 characters or 14 characters in question, automatically provide by the presently disclosed invention, within a non-standard text log the goods or services associated with the stock number or order number in question, as well as other relevant details (such as date of the order, quantities of various goods or services ordered, lot number, manufacturer code, sales category, season, etc). In further embodiments of the invention, feedback from computer or human users at a later time can be used, in-part or in its entirety, to improve results obtained from training module 165 (such as by automatically presenting a questionnaire to a user after generation of any text log described herein, or other means). Training module 165 may use other approaches and/or techniques, in various embodiments of the invention to improve results.

Recording device 150 represents hardware (such as a microphone) and/or software for storing in real-time speech from a single individual, or conversation involving multiple individuals for further utilization as discussed herein. Recording device 150 may, alternatively or in addition, record voice and/or other sound from television, music, films, etc. Recording device 150 may also record music, computer sounds, musical notes, atmospheric noise, etc., as are present in the area surrounding recording device 150. Recording device 150 may serve to simply record and transmit voice to text conversion engine 120 in real-time for further processing, or recording device 150 may store such voice for some length of time in voice data server 155. Recording device 150 may be directly connected to text conversion engine 120, rather than available via network 170.

Voice data server 155 represents software and/or hardware for storing speech from a single individual or conversation involving multiple individuals, with such voice or conversation made available via network 180. Voice data server 155 may also store recorded music, computer sounds, musical notes, atmospheric noise, etc., as collected by recording device 150. Voice data server 155 may be directly connected to text conversion engine 120, rather than through network 180.

Text log display module 170 represents software and/or hardware for displaying the complete text log to a user of the presently disclosed invention. Text log display module 170 may also make the complete text log available to a user for further processing, providing definitions of various words, options to store, etc. Text log display module 170, in various embodiments of the invention, may also make the standard text log and/or the non-standard text log available to a user for review, selection of options, etc. Standard text log may be embodied such as in display screen 920, such as shown in FIG. 3.

Figure 2A:
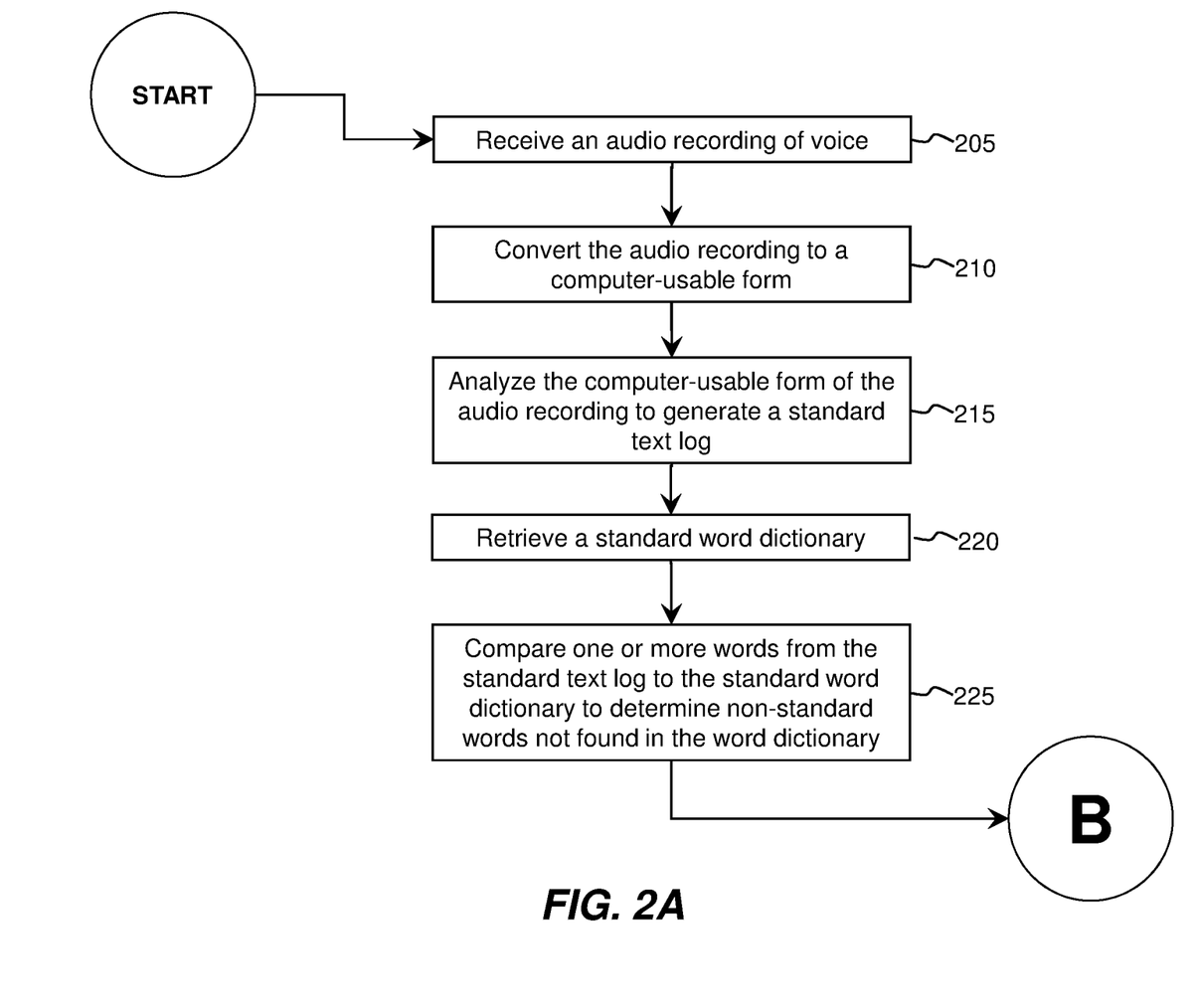
FIGS. 2A, 2B, and 2C are a flowchart depicting operational steps performed within the environment 100 for converting verbal communications including non-standard speech to text of FIG. 1, in accordance with an embodiment of the present invention.
Figure 2B:
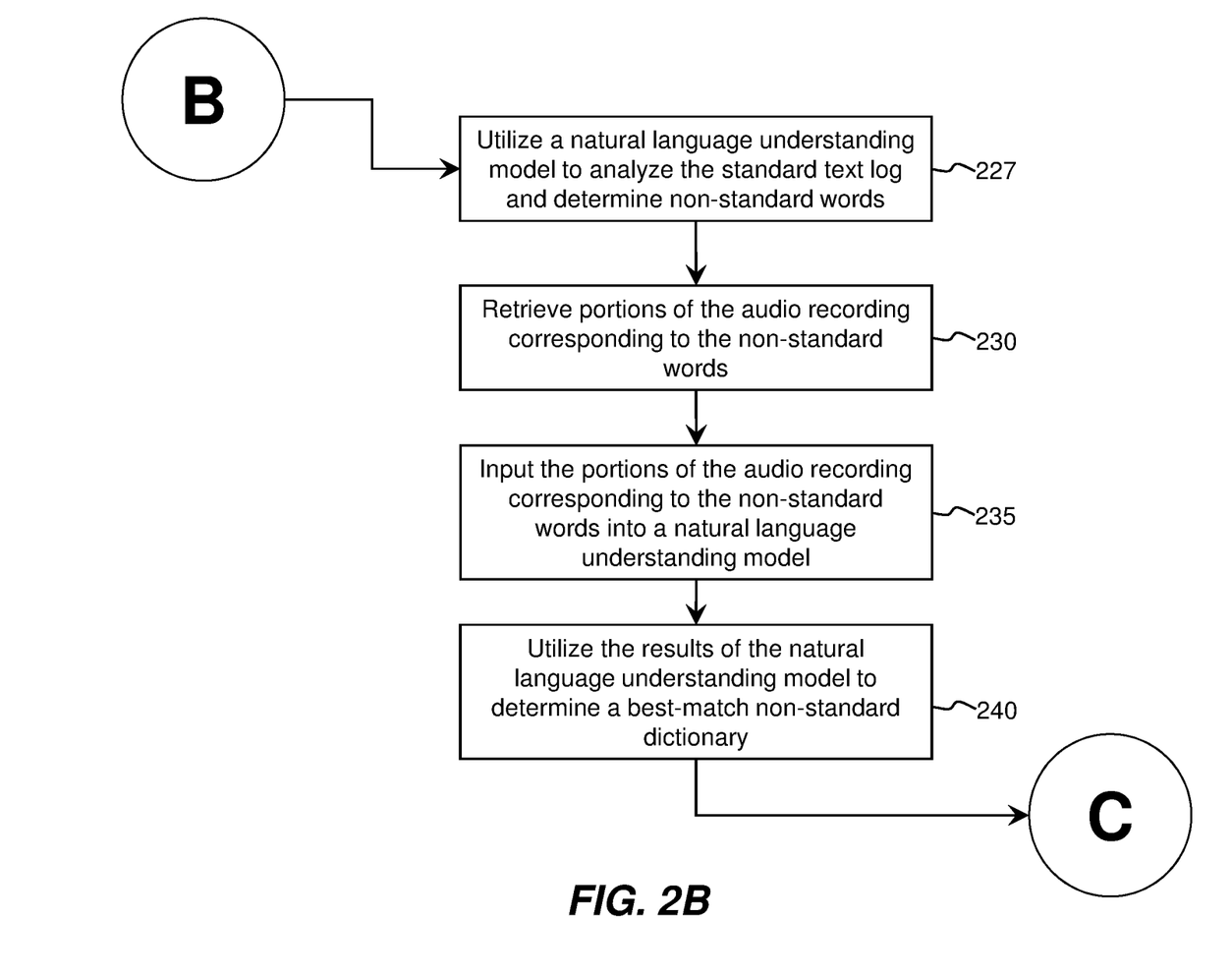
Figure 2C:
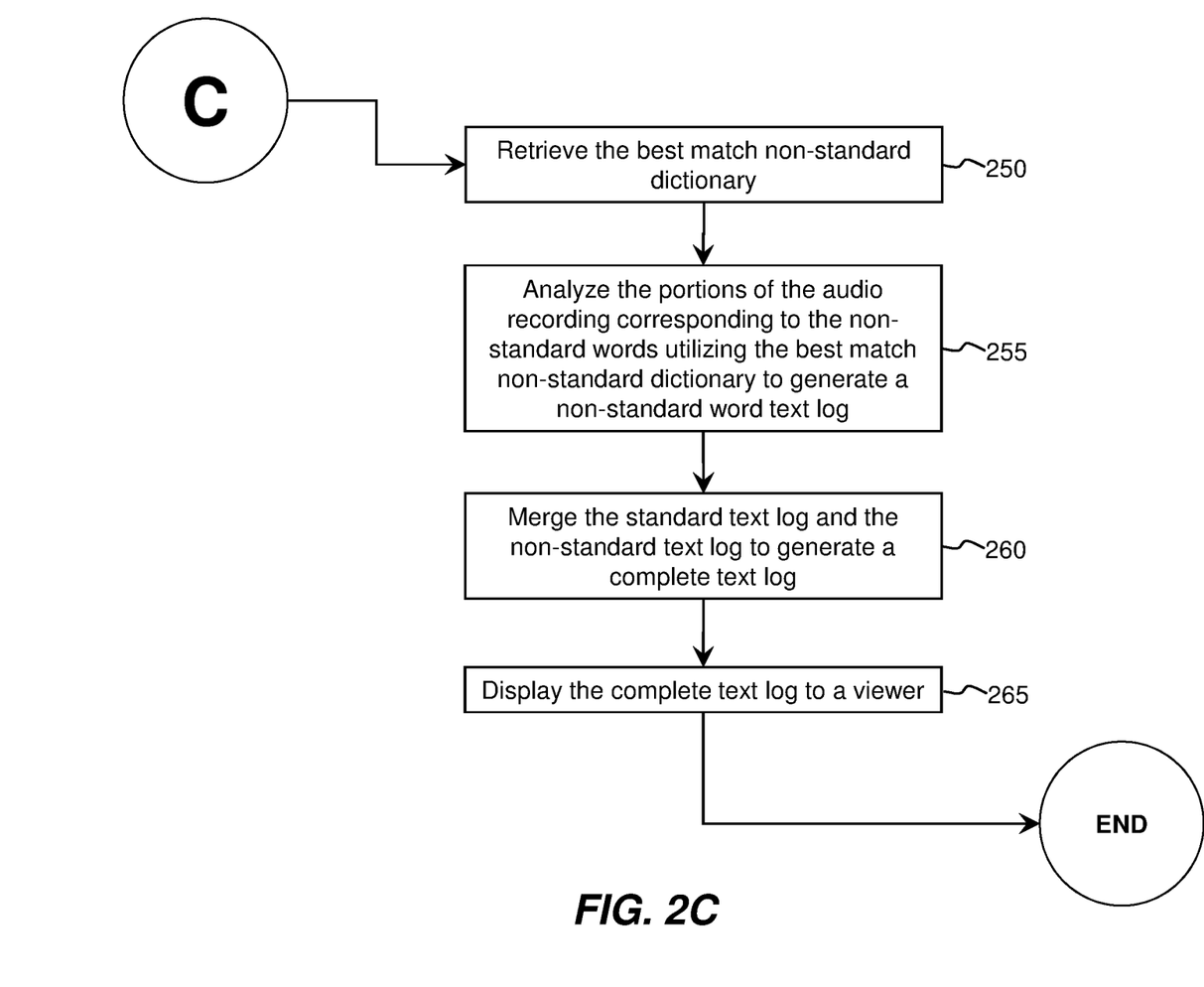

FIGS. 2A, 2B, and 2C are a flowchart depicting operational steps performed within the environment 100 for converting verbal communications including non-standard speech to text. At step 205, an audio recording of voice is received by standard audio processing unit 124 from recording device 150 and/or voice data server 155. At step 210, standard audio processing unit 124 converts the audio recording to a computer-usable form, usable in connection with the presently disclosed invention. At step 215, standard text log generation engine 126 analyzes the computer-usable form to generate a standard text log for the audio recording. At step 220, standard dictionary comparison unit 128 retrieves a standard word dictionary (such as from dictionary server 160 or available elsewhere in environment 100). At step 225, standard dictionary comparison unit 128 compares one or more words from the standard text log to the standard word dictionary to determine non-standard words (or "non-dictionary words") not found in the word dictionary.

Continuing with regard to FIGS. 2A, 2B, and 2C, at step 227 standard text natural language understanding unit 129 uses a natural language understanding model of standard text log generator 122 to analyze the standard text log and determine non-standard words (or "non-dictionary words") found in the standard text log (i.e. words that are out of place, and seem to have been incorrectly transcribed by standard text natural language understanding unit 129. At step 230, non-standard audio correspondence unit 134 of non-standard text log generator 132 retrieves portions of audio recording corresponding to the non-standard words (determined by the standard dictionary comparison unit 128 and/or the standard text natural language understanding unit 129), from voice data server 155 or elsewhere. At step 235, the portions of the audio recording corresponding to the non-standard words are input into a natural language understanding model of non-standard text natural language understanding unit 136. At step 240, non-standard dictionary comparison unit 138 utilizes the results of the non-standard text natural language understanding unit 136 to determine a best-match non-standard dictionary. At step 250, the non-standard dictionary comparison unit 138 retrieves the best match non-standard dictionary from dictionary server 160. At step 255, the non-standard dictionary comparison unit 138 analyzes the portions of the audio corresponding to the non-standard words using the best-match non-standard dictionary to generate a non-standard word text log. At step 260, text log merger 142 merges the standard text log and the non-standard text log to generate a complete text log, and transmits the complete text log to the text log display module 170. At step 265, the complete text log is displayed via the text log display module 170.

Figure 3:
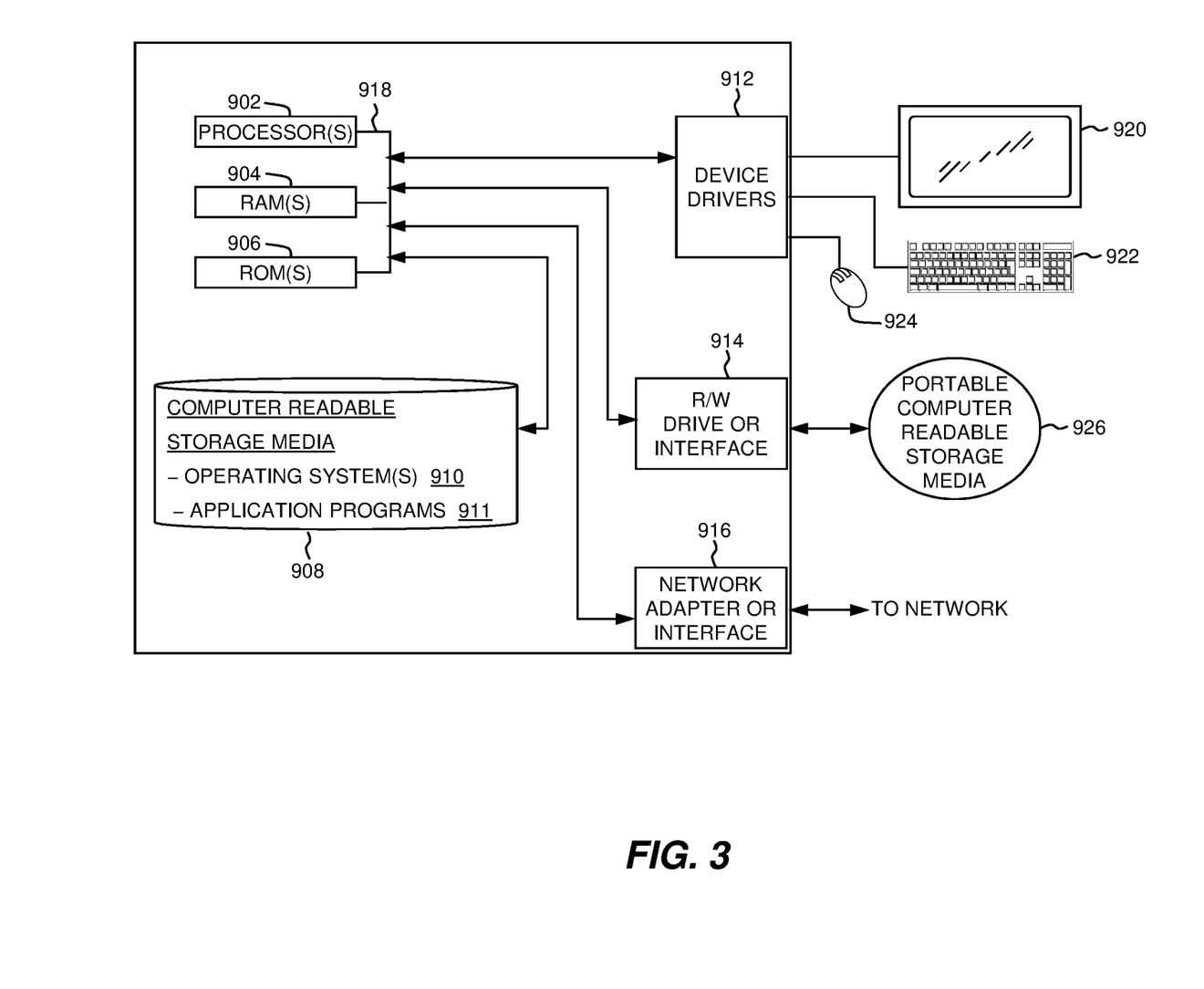
FIG. 3 depicts a block diagram of components of text conversion engine 120, recording device 150, voice data server 155, dictionary server 160, training module 165, and/or text log display module 170, in accordance with an embodiment of the present invention.

FIG. 3 depicts a block diagram of components of a block diagram of components of text conversion engine 120, recording device 150, voice data server 155, dictionary server 160, training module 165, and/or text log display module 170 in the environment 100 for converting verbal communications including non-standard speech, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Text conversion engine 120, recording device 150, voice data server 155, dictionary server 160, training module 165, and/or text log display module 170 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, environment 100 for converting verbal communications including non-standard speech, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Text conversion engine 120, recording device 150, voice data server 155, dictionary server 160, training module 165, and/or text log display module 170 may also include a R/W drive or interface 914 to read from and write to one or more portable computer readable storage media 926. Application programs 911 on client device 120 and web server(s) may be stored on one or more of the portable computer readable storage media 926, read via the respective R/W drive or interface 914 and loaded into the respective computer readable storage media 908.

Text conversion engine 120 recording device 150, voice data server 155, dictionary server 160, training module 165, and/or text log display module 170 may also include a network adapter or interface 916, such as a TCP/IP adapter card or wireless communication adapter (such as a 4G wireless communication adapter using OFDMA technology). Application programs 911 on client device 120 and web server(s) 170 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Text conversion engine 120, recording device 150, voice data server 155, dictionary server 160, training module 165, and/or text log display module 170 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, VLANs, virtual networks, virtual machines, computing containers, cloud-connected components, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a virtual network, a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
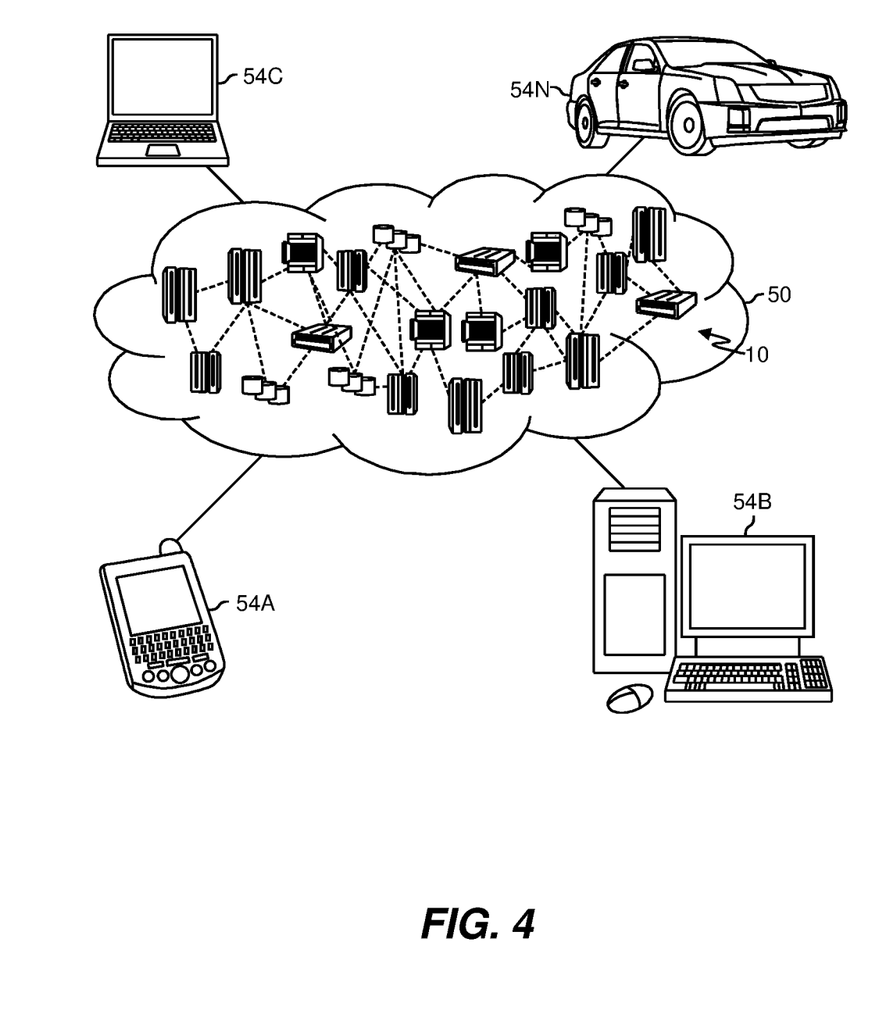
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
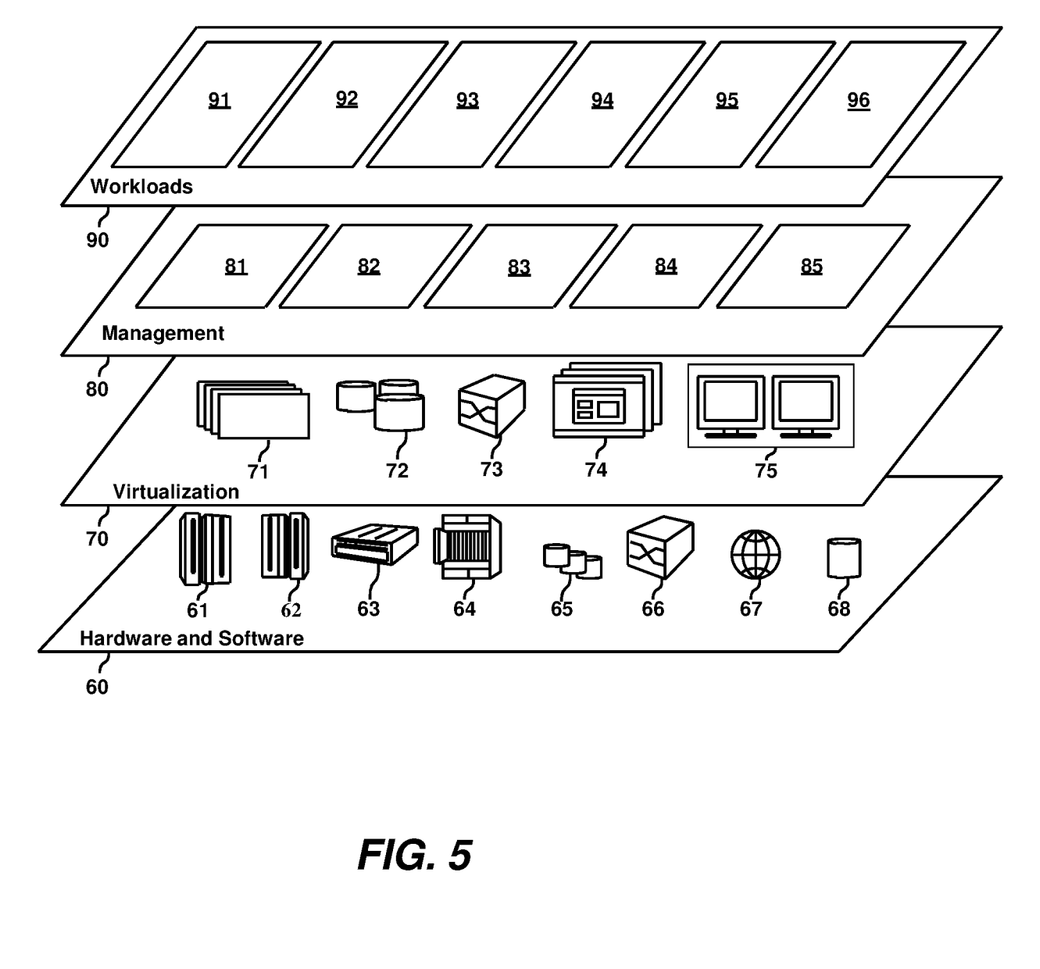
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for converting verbal communications including non-standard speech to text.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of using a computing device to convert verbal communications including non-standard speech to text, the method comprising:
   receiving, by a computing device, an audio recording of voice and converting the audio recording to a computer-usable form usable by the computing device, wherein converting the audio recording to the computer-usable form comprises:

parsing the audio recording into one or more syllables; and storing by the computing device the one or more syllables into one or more data structures to generate the computer-usable form;

analyzing by the computing device the computer-usable form of the audio recording to generate a standard text log for the audio recording;

retrieving a standard word dictionary;

comparing one or more words from the standard text log to the standard word dictionary to determine one or more non-standard words not found in the word dictionary;

retrieving one or more portions of the audio recording corresponding to the one or more non-standard words;

inputting the one or more portions of the audio recording corresponding to the one or more non-standard words into a natural language understanding model;

utilizing by the computing device results of the natural language understanding model to determine a best-match non-standard dictionary for interpreting the one or more non-standard words;

retrieving the best-match non-standard dictionary;

analyzing by the computing device the one or more portions of the audio recording corresponding to the one or more non-standard words utilizing the best-match non-standard dictionary to generate a non-standard text log; and merging by the computing device the standard text log and the non-standard text log to generate a complete text log.

2. The method of claim 1, wherein the non-standard dictionary is selected from the group consisting of a business dictionary, a technical dictionary, a medical dictionary, a sound dictionary, and a foreign language dictionary.

3. The method of claim 1, wherein the analyzing of the computer-usable form of the audio recording comprises analyzing a wave form of the audio recording.

4. The method of claim 1, further comprising displaying the complete text log to a user.

5. The method of claim 1, wherein comparing one or more words from the standard text log to the standard word dictionary comprises utilizing domain-specific rules.

6. The method of claim 1, wherein the natural language understanding model utilizes, at least in-part, domain-specific rules unique to each non-standard dictionary for interpreting the one or more non-standard words.

7. The method of claim 1, further comprising utilizing by the computing device the natural language understanding model to analyze the standard text log and further determine one or more non-standard words in the standard text log.

8. A computer program product utilizing a computing device to convert verbal communications including non-standard speech to text, the computer program product comprising:

one or more non-transitory computer-readable storage media and program instructions stored on the one or more non-transitory computer-readable storage media, the program instructions, when executed by the computing device, cause the computing device to perform a method comprising:

receiving, by a computing device, an audio recording of voice and converting the audio recording to a computer-usable form usable by the computing device, wherein converting the audio recording to the computer-usable form comprises:

parsing the audio recording into one or more syllables; and storing by the computing device the one or more syllables into one or more data structures to generate the computer-usable form;

analyzing by the computing device the computer-usable form of the audio recording to generate a standard text log for the audio recording;

retrieving a standard word dictionary;

comparing one or more words from the standard text log to the standard word dictionary to determine one or more non-standard words not found in the word dictionary;

retrieving one or more portions of the audio recording corresponding to the one or more non-standard words;

inputting the one or more portions of the audio recording corresponding to the one or more non-standard words into a natural language understanding model;

utilizing by the computing device results of the natural language understanding model to determine a best-match non-standard dictionary for interpreting the one or more non-standard words;

retrieving the best-match non-standard dictionary;

analyzing by the computing device the one or more portions of the audio recording corresponding to the one or more non-standard words utilizing the best-match non-standard dictionary to generate a non-standard text log; and merging by the computing device the standard text log and the non-standard text log to generate a complete text log.

9. The computer program product of claim 8, wherein the non-standard dictionary is selected from the group consisting of a business dictionary, a technical dictionary, a medical dictionary, a sound dictionary, and a foreign language dictionary.

10. The computer program product of claim 8, wherein the analyzing of the computer-usable form of the audio recording comprises analyzing a wave form of the audio recording.

11. The computer program product of claim 8, further comprising displaying the complete text log to a user.

12. The computer program product of claim 8, wherein comparing the one or more words from the standard text log to the standard word dictionary comprises utilizing domain-specific rules.

13. The computer program product of claim 8, wherein the natural language understanding model utilizes, at least in-part, domain-specific rules unique to each non-standard dictionary for interpreting the one or more non-standard words.

14. The computer program product of claim 8, further comprising utilizing by the computing device the natural language understanding model to analyze the standard text log and further determine one or more non-standard words in the standard text log.

15. A computer system utilizing a computing device to convert verbal communications including non-standard speech to text, the computer system comprising:

one or more computer processors;

one or more computer-readable storage media;

program instructions stored on the computer-readable storage media for execution by at least one of the one or more processors, the program instructions comprising:

program instructions to receive, by a computing device, an audio recording of voice and convert the audio recording to a computer-usable form usable by the computing device, wherein converting the audio recording to the computer-usable form comprises program instructions to:

parse the audio recording into one or more syllables; and store by the computing device the one or more syllables into one or more data structures to generate the computer-usable form;

program instructions to analyze by the computing device the computer-usable form of the audio recording to generate a standard text log for the audio recording;

program instructions to retrieve a standard word dictionary;

program instructions to compare one or more words from the standard text log to the standard word dictionary to determine one or more non-standard words not found in the word dictionary;

program instructions retrieve one or more portions of the audio recording corresponding to the one or more non-standard words;

program instructions to input the one or more portions of the audio recording corresponding to the one or more non-standard words into a natural language understanding model;

program instructions to utilize by the computing device results of the natural language understanding model to determine a best-match non-standard dictionary for interpreting the one or more non-standard words;

program instructions to retrieve the best-match non-standard dictionary;

program instructions to analyze by the computing device the one or more portions of the audio recording corresponding to the one or more non-standard words utilizing the best-match non-standard dictionary to generate a non-standard text log; and program instructions to merge by the computing device the standard text log and the non-standard text log to generate a complete text log.

16. The computer system of claim 15, wherein the non-standard dictionary is selected from the group consisting of a business dictionary, a technical dictionary, a medical dictionary, a sound dictionary, and a foreign language dictionary.

17. The computer system of claim 15, wherein the computer system further displays the complete text log to the user.

* * * * *